Patented Apr. 4, 1950

2,502,930

UNITED STATES PATENT OFFICE 2,502,930

PREPARATION OF CATALYST

Russell L. Daussat and Ottis W. Moak, Baton Rouge, La., assignors to Standard Oil Development Company, a corporation of Delaware No Drawing. Application June 30, 1944, Serial No. 543,045

11 Claims. (Cl. 252—455)

The present invention relates to the novel features hereinafter fully disclosed in the specification and appended claims.

The invention relates to the conversion of naphthenic hydrocarbons into aromatics at elevated temperatures in the presence of a catalyst and added hydrogen. It is a matter of record that, for example, the production of toluene has been successfully accomplished on a commercial scale by contacting a petroleum naphtha fraction containing methyl-cyclohexane and/or ethyl-cyclopentane with a catalyst such as molybdenum oxide supported on "activated alumina" at elevated temperatures and in the presence of added hydrogen. This operation is commonly referred to as "hydroforming."

Our present invention relates to the preparation and use of a new class of catalysts suitable for use in the hydroforming process because of its high heat stability. As is known, during the hydroforming of naphthas there comes a time when it is necessary to interrupt the productive phase of the operation to regenerate the catalyst by reason of the fact that the productive phase causes the deposition of carbonaceous deposits on the catalyst, which deposits eventually lower its activity and necessitate the removal of these deposits to restore the activity of the said catalyst. There are methods of hydroforming naphthas which do not require regeneration of catalyst but the usual and more commonly practiced methods are those requiring periodical regeneration of the catalyst. Since it is desirable to regenerate the catalyst rapidly and since the regeneration temperatures may be rather high, it is obviously a desirable attribute or property of the catalyst that it will withstand exposure to repeated high temperature regeneration phases, say temperatures up to 1150–1200° F. without undergoing baking, fusing, loss of porosity or otherwise being impaired as to activity.

We have discovered a class of catalysts which will withstand repeated exposure to said temperatures for an extended period of time without undergoing any deterioration or impairment in catalyst activity. In general, these catalysts consist of a metallic oxide supported on a carrier comprising a form of aluminum oxide characterized chiefly by its low sodium content.

In preparing this catalyst we may start with "Aluminum Hydrate," which is a commercial material having the formula $Al_2O_3.3H_2O$ and characterized by a low sodium content, say about 0.17% measured as $Na_2O$, although it may contain up to 1.0%. The "Aluminum Hydrate" is impregnated with a water-soluble salt of a known dehydrogenation metallic oxide such as a 6th group metallic oxide, for example ammonium molybdate, and the impregnated material is then heated for an extended period of time at temperatures of from 1100–1200° F. for the purpose of converting the molybdate salt to molybdenum oxide, and also to activate the catalyst. Thereafter, the catalyst composition is admixed with a plastic clay which is also low in sodium content (0.04–0.14% $Na_2O$), the mass is then shaped by extrusion or other known methods and after steam drying it is activated at 1150° F. or thereabouts for an extended period of time. This process generally outlined above results in the production of a catalyst which is highly heat stable and also one of high mechanical strength.

Our present invention is distinguished from known methods of preparing catalysts of the type here in question in that the order of steps is different. Thus, it will be noted from the above general description that the clay was added to the impregnated alumina after activation. In the older process, the clay was first mixed with the alumina and this mixture was impregnated, dried and activated.

To give more details regarding our invention, we set forth below a specific example which serves to illustrate our invention without, however, imposing any limitation thereon.

Example

"Aluminum Hydrate" (that is, the trihydrate identified previously) containing approximately 1% sodium oxide was purified with acetic acid to reduce the soda content to about 0.2%. Glacial (99.5%) acetic acid was then added (2.5 liters per 100 lbs. of hydrate), and the mixture was agitated. Ammonium molybdate solution prepared by adding 360 grams of molybdena oxide per liter of dilute ammonium hydroxide was added to the "Aluminum Hydrate" so that approximately 8% molybdenum oxide would be present in the final, dry catalyst. The mixture was dried and activated at 1150–1200° F. in an oven. Clay in an amount of about 20% based on the alumina hydrate was mixed with this material, followed by moistening, extrusion, drying, and activation at 1150–1200° F. The catalysts prepared by this procedure gave evidence of improved heat stability and strength.

The amount of clay may be more or less than 20% by weight. It is preferred that the final catalyst contains less than 1% sodium calculated as $Na_2O$ and even lower percentages, such as not exceeding 0.10%, give excellent results.

We set forth below data to illustrate the efficacy of the new technique for the preparation of "hydroforming" catalysts.

In these tests we subjected a naphtha having the below inspection to "hydroforming" under the following conditions:

Temperature in the reactor __ 900° F.
Pressure in the reactor _____ 200 lbs./sq. in.
Gas, predominantly hydrogen, fed to the reactor _____ 1500 cu. ft./bbl.
Feed rate _____ 1.3 vols. of oil per vol. of catalyst per hour, the catalyst being disposed, of course, in the reactor in the form of a stationary bed.

*Inspection*

Gravity (A. P. I.) _____ 55.7°
Aniline point, °F_____ 113
Sulfur, per cent _____ 0.0058
Reid vapor pressure_____ 1.2
Volume per cent aromatics_____ 12.0
Initial B. P., °F_____ 222
Final B. P., °F_____ 264
Recovery, per cent_____ 98.5

We now set forth below the results of several hydroforming runs we made under the above conditions:

new method, were placed in a steel cylinder and subjected to pressure by means of an hydraulic press. The pressure was released, material was removed, and the fines were separated with an 8-mesh screen and weighed. The results of these tests are set forth below:

| Catalyst Sample | Depth of Bed, cm. | Pressure, p. s. i. | Fines through 8 mesh Wt. Per Cent |
|---|---|---|---|
| Prepared by old technique $Al_2O_3$—$MoO_3$ on clay | 3.7 | 110 | 5.2 |
| | 2.5 | 220 | 21.8 |
| | 2.5 | 370 | 35.0 |
| Prepared by new technique $Al_2O_3$—$MoO_3$ on clay | 2.5 | 220 | 2.3 |
| | 2.5 | 370 | 6.5 |

In another test which we designate as the side strength test, we placed pellets of each of the catalysts, that is pellets $\frac{3}{16}$ inch in diameter by $\frac{3}{16}$ inch long, (lying on their sides) between plane parallel crushing jaws and noted the number of pounds required to cause fracture:

| Catalyst Sample | Pellet Strength (Side) |
|---|---|
| | *Pounds* |
| Prepared by old technique $Al_2O_3$—$MoO_3$ on clay | 3–5 |
| Prepared by new technique $Al_2O_3$—$MoO_3$ on clay | 12–18 |

Reviewing the above data in the two tables, it will be noted that with respect to the test in the hydraulic press that the catalyst prepared by the new method was much stronger or had a greater strength than the old method as evidenced by the weight per cent of fines produced in the test. With respect to the side strength, it will be noted that it took 12–18 lbs. to fracture the new catalyst, while 3–5 lbs. fractured the old.

As a further test of strength, we placed 100 grams of the old catalyst in a ball mill and tumbled it for three hours, the mill having one-quart capacity. The material was withdrawn from the

*Liquid product inspections*

| Preparation | Catalyst | Aniline Point | Per Cent Aromatics | Specific Surface m.2/g. | Vol. Per Cent Aromatics Yield Based on Feed |
|---|---|---|---|---|---|
| Old Catalyst Impregnated with $MoO_3$. | Purified aluminum hydrate by hot acetic acid, plus low-soda ball clay (1). | 46 | 42.2 | 125 | 37.6 |
| | Test after heating 6 hours at 1450° F. in dry air | 70 | 27.7 | 22.1 | 25.7 |
| Our Catalyst Impregnated with $MoO_3$. | Aluminum hydrate (purified) impregnated, activated plus low-soda ball clay (2). | 55 | 40.2 | 131 | 35.9 |
| | Test after heating 6 hours at 1450° F. in dry air | 54 | 44.2 | 80 | 40.0 |
| | 100 lb. batch of catalyst prepared as in (2) above | 56 | 43.7 | 112 | 40.6 |
| | Test after heating 6 hours at 1450° F. in dry air | 53 | 43.4 | 72 | 40.0 |

The foregoing data show that the catalyst prepared by our new process had slightly lower initial activity as evidenced by the aniline point, than did the catalyst prepared by the older method, but the stability of our new catalyst against heat treatment was superior to that for the similarly heat treated catalyst prepared by the older method.

Another important feature of our new catalyst is that it possesses high mechanical strength. We conducted ball mill attrition tests and crushing strength tests which gave evidence of the superior strength of these catalysts. The following data from crushing strength tests tend to establish the superior strength of our new catalyst as compared with the old. The catalyst samples, that is, one prepared according to the old method and one prepared according to our ball mill and screened through a 10-mesh screen. The weight per cent left on the screen is the ball mill attrition value and is set forth below:

| Catalyst | Wt. Per Cent on 10 Mesh After 3 hrs. Tumbling |
|---|---|
| Old, $\frac{3}{16}$" pellets | 96.8 |
| New, $\frac{3}{16}$" pellets | 99.7 |

To recapitulate briefly, our present invention relates to a method of preparing a hydroforming catalyst of high heat stability. Briefly, it involves first treating "Aluminum Hydrate" which is peptized by treatment with acetic acid. Following this acid treatment, the material is impregnated with an ammonium molybdate solution followed by drying and activation for six hours at 1150° F. Thereafter the material is pulverized, mixed with a low sodium content ball clay, and then extruded into convenient size pellets, such as 1/16 inch, again steam dried and activated for, say, 4 hours at 1150° F. By thus preparing the hydroforming catalyst we have discovered that the said catalysts maintain their activity when exposed to high temperatures for a greater period of time and this is important since during the regeneration of the catalyst it is necessary to treat the fouled catalyst with an oxidizing gas at high temperatures.

Another important attribute of our new class of catalyst is their high mechanical strength. This feature is very important in large scale operation.

Numerous modifications of our invention will suggest themselves to those who are familiar with this art without departing from the spirit thereof.

What we claim is:

1. The method of producing a catalyst of increased heat stability which comprises impregnating aluminum trihydrate of low sodium content with a soluble compound of molybdenum, heating the impregnated mass for an extended period of time to convert the soluble molybdenum compound to molybdenum oxide and activate the catalyst, thereafter mixing the activated catalyst composition with a plastic clay of low soda content and activating the catalyst composition by a prolonged heat treatment at elevated temperatures.

2. The method of claim 1, in which the aluminum trihydrate composition is treated with acetic acid before impregnation to reduce the sodium content.

3. The method of claim 1, in which the heat treatment of the mixture of activated catalyst composition and the plastic clay at temperatures within the range of from 1100–1200° F. from four to six hours.

4. The method set forth in claim 1, in which the aluminum trihydrate is impregnated with ammonium molybdate.

5. The method of claim 1, in which the catalyst in final form contains about 8 weight per cent of molybdenum oxide based on the total weight of the catalyst.

6. The method set forth in claim 1, in which the catalyst contains in final form about 20 weight per cent clay.

7. The method of preparing a heat stable catalyst of high mechanical strength which comprises first impregnating aluminum trihydrate of low sodium content with a water-soluble compound of molybdenum, heating the impregnated aluminum trihydrate for a sufficient period of time to decompose the said compound of molybdenum oxide and to activate the composition, thereafter mixing a plastic clay with the activated composition, shaping the mixture and again heating the mixture at elevated temperatures to form the final catalyst body.

8. The method of claim 7, in which the aluminum trihydrate is impregnated with ammonium molybdate.

9. The method of claim 7, in which 20 per cent of clay is contained in the final catalyst.

10. The method of claim 1, in which the final catalyst contains less than 1 per cent sodium calculated as $Na_2O$.

11. The method of claim 7, in which the sodium content of the final catalyst does not exceed 0.10 per cent, calculated as $Na_2O$.

RUSSELL L. DAUSSAT.
OTTIS W. MOAK.

REFERENCES CITED

The following references are of record in the file of this patent:

UNITED STATES PATENTS

| Number | Name | Date |
|---|---|---|
| 1,232,830 | Morey et al. | July 10, 1917 |
| 1,899,584 | Navias | Feb. 28, 1933 |
| 2,148,342 | Fairchild | Feb. 21, 1939 |
| 2,184,235 | Groll et al. | Dec. 19, 1939 |
| 2,265,682 | Bennett | Dec. 9, 1941 |
| 2,296,406 | Spicer et al. | Sept. 22, 1942 |
| 2,340,935 | Connolly | Feb. 8, 1944 |
| 2,345,600 | Heard et al. | Apr. 4, 1944 |
| 2,400,025 | Scharmann | May 7, 1946 |
| 2,402,440 | Owen | June 18, 1946 |
| 2,406,420 | Weiser et al. | Aug. 27, 1946 |
| 2,444,965 | Thomas et al. | July 13, 1948 |